US010902274B2

(12) United States Patent
Benge et al.

(10) Patent No.: US 10,902,274 B2
(45) Date of Patent: Jan. 26, 2021

(54) OPTING-IN OR OPTING-OUT OF VISUAL TRACKING (71) Applicant: Adobe Inc., San Jose, CA (US)

(72) Inventors: David Eldridge Benge, Poulsbo, WA (US); Max Gray Edell, Ottawa (CA)

(73) Assignee: Adobe Inc., San Jose, CA (US)

(*) Notice: Subject to any disclaimer, the term of this patent is extended or adjusted under 35 U.S.C. 154(b) by 141 days.

(21) Appl. No.: 15/967,224

(22) Filed: Apr. 30, 2018

(65) Prior Publication Data
US 2019/0332880 A1 Oct. 31, 2019

(51) Int. Cl.
G06K 9/20 (2006.01)
G06K 9/00 (2006.01)

(52) U.S. Cl.
CPC ....... G06K 9/2063 (2013.01); G06K 9/00255 (2013.01)

(58) Field of Classification Search
CPC ............ G06K 9/00255; G06K 9/2063; G06K 9/00228; G06K 9/00288; H04N 5/23219; H04N 21/44218
USPC ......................................................... 348/169
See application file for complete search history.

(56) References Cited

U.S. PATENT DOCUMENTS

| 6,473,114 B1* | 10/2002 | Strubbe | H04N 7/142 348/14.07 |
| 7,564,476 B1* | 7/2009 | Coughlan | H04N 7/147 348/14.01 |
| 7,920,158 B1* | 4/2011 | Beck | H04N 5/23219 348/14.08 |
| 8,126,190 B2* | 2/2012 | Jung | G06K 9/3241 382/100 |
| 9,350,914 B1* | 5/2016 | Kaur | H04N 5/23229 |
| 2003/0108240 A1* | 6/2003 | Gutta | G06T 5/002 382/181 |
| 2004/0081338 A1* | 4/2004 | Takenaka | G08B 13/1961 382/118 |
| 2008/0193018 A1* | 8/2008 | Masuda | G06K 9/00228 382/190 |
| 2009/0262987 A1* | 10/2009 | Ioffe | G06T 11/001 382/118 |
| 2011/0123068 A1* | 5/2011 | Miksa | G06T 5/20 382/105 |
| 2012/0072845 A1* | 3/2012 | John | G06F 16/48 715/738 |

(Continued)

Primary Examiner — Christopher S Kelley
Assistant Examiner — Kathleen M Walsh
(74) Attorney, Agent, or Firm — SBMC (57) ABSTRACT In implementations of opting-in or opting-out of visual tracking, a computing device maintains digital images received for scanning, and includes an image scanning system that receives a digital image depicting one or more faces of persons captured in the digital image. The image scanning system is implemented to detect a face of a person who is depicted in the digital image from a scan of the digital image. The image scanning system can then scan the digital image for a visual tracking identifier that indicates a preference of the person for one of opting-in or opting-out of visual tracking. The image scanning system can detect the visual tracking identifier associated with the person from the scan of the digital image, and continue or discontinue the visual tracking of the person based on the visual tracking identifier indicating that the person opt-in or opts-out of visual tracking.

20 Claims, 6 Drawing Sheets

(56) References Cited

U.S. PATENT DOCUMENTS

| | | | |
|---|---|---|---|
| 2013/0035979 A1* | 2/2013 | Tenbrock | G06Q 30/02 |
| | | | 705/7.29 |
| 2014/0080428 A1* | 3/2014 | Rhoads | H04W 4/025 |
| | | | 455/88 |
| 2014/0368604 A1* | 12/2014 | Lalonde | H04N 7/147 |
| | | | 348/14.08 |
| 2015/0220777 A1* | 8/2015 | Kauffmann | H04N 5/2621 |
| | | | 382/103 |
| 2017/0220816 A1* | 8/2017 | Matusek | G06K 9/3233 |
| 2018/0061010 A1* | 3/2018 | Akselrod | G06K 9/00288 |
| 2018/0189505 A1* | 7/2018 | Ghafourifar | G06F 21/602 |
| 2018/0225703 A1* | 8/2018 | State | G06Q 50/01 |
| 2018/0349736 A1* | 12/2018 | Bapat | G06K 9/00295 |
| 2019/0080155 A1* | 3/2019 | Ganong | G06K 9/00261 |
| 2020/0098096 A1* | 3/2020 | Moloney | G06N 5/00 |

\* cited by examiner

```
┌─────────────────────────────────────────────┐
│ Scan a digital image to determine whether a face │
│   of a person is depicted in the digital image    │
│                     302                           │
└─────────────────────────────────────────────┘
                       │
                       ▼
┌─────────────────────────────────────────────┐
│  Detect a face of the person who is depicted in the │
│   digital image from the scan of the digital image  │
│                     304                             │
└─────────────────────────────────────────────┘
                       │
                       ▼
┌─────────────────────────────────────────────┐
│ Determine a region within a distance from the face of the person │
│ in which to scan the digital image for a visual tracking identifier │
│                     306                                          │
└─────────────────────────────────────────────┘
                       │
                       ▼
┌─────────────────────────────────────────────┐
│   Scan the digital image for the visual tracking identifier │
│    that indicates a preference of the person for one of     │
│         opting-in or opting-out of visual tracking          │
│                          308                                │
└─────────────────────────────────────────────┘
                       │
                       ▼
┌─────────────────────────────────────────────┐
│   Detect the visual tracking identifier associated with     │
│   the person based on the scanning of the digital image     │
│                          310                                │
└─────────────────────────────────────────────┘
                       │
                       ▼
┌─────────────────────────────────────────────┐
│     Discontinue the visual tracking of the person           │
│    based on the visual tracking identifier indicating       │
│        that the person opts-out of visual tracking          │
│                          312                                │
└─────────────────────────────────────────────┘
                       │
                       ▼
┌─────────────────────────────────────────────┐
│   Crop the face of the person out of the digital image      │
│    based on the visual tracking identifier indicating       │
│        that the person opts-out of visual tracking          │
│                          314                                │
└─────────────────────────────────────────────┘
```

OPTING-IN OR OPTING-OUT OF VISUAL TRACKING

BACKGROUND

The use of camera devices is more prevalent than ever, given that most everyone has a camera integrated in a mobile device, such as a mobile phone or tablet device. Further, cameras are increasingly used with security and tracking systems, particularly in outdoor locations, in public forums, and in public buildings or businesses where people often visit, such as in a location that is open to the public or even in a secured location that is only accessible by employees of a business. In particular, members of the public may be in attendance at a public or private function, such as at a seminar or other similar public, private, or semi-private function, and are on-camera. Generally, digital images of events and the participants may be captured and processed as computer vision assets, may be streamed across networks, such as through an intranet and via the Internet, and may also be uploaded to a cloud-based service for analysis and processing. In some countries, regions, and/or jurisdictions, the legal issues of processing captured digital images of people are compounded by requirements that notices of camera use are posted, and in some instances, signed waivers may need to be collected from each person whose image is captured and potentially processed as a computer vision asset.

SUMMARY

This Summary introduces features and concepts of opting-in or opting-out of visual tracking, which is further described below in the Detailed Description and shown in the Figures. This Summary should not be considered to describe essential features of the claimed subject matter, nor used to determine or limit the scope of the claimed subject matter.

Aspects of opting-in or opting-out of visual tracking are described. In implementations, a computing device maintains digital images received for scanning, and includes an image scanning system that receives a digital image depicting one or more faces of persons captured in the digital image. The image scanning system can scan the digital image utilizing face object detection to detect a face of a person who is depicted in the digital image. The image scanning system can then scan the digital image in a region within a vicinity of the face of the person for a visual tracking identifier associated with the person, and that indicates a preference of the person for one of opting-in or opting-out of visual tracking.

The image scanning system is implemented to detect the visual tracking identifier associated with the person based on the scan of the digital image. The image scanning system can then discontinue the visual tracking of the person based on the visual tracking identifier having a symbol that indicates the person opts-out of visual tracking for computer vision processing. Alternatively, the image scanning system is implemented to continue the visual tracking of the person based on the visual tracking identifier having a symbol that indicates the person opts-in to visual tracking for computer vision processing. In an implementation, the image scanning system can default to opting-out of visual tracking if the symbol of the visual tracking identifier is not distinguishable in the digital image so as to indicate that the person opts-in to visual tracking.

BRIEF DESCRIPTION OF THE DRAWINGS

Implementations of opting-in or opting-out of visual tracking are described with reference to the following Figures. The same numbers may be used throughout to reference similar features and components that are shown in the Figures.

DETAILED DESCRIPTION

Implementations of opting-in or opting-out of visual tracking are described, and provide that a person can opt-in, or alternatively, opt-out of visual tracking for computer vision processing. Generally, a group of people may be gathered together as participants in attendance at a public or private function, at a seminar, or other event and they are on-camera. Often, a public building or business includes surveillance cameras, as well as other types of monitoring devices, and the cameras capture digital images of the event and the participants. The captured digital images are typically communicated to a computing device or server device associated with the building or business in which the digital images of the people are captured. Not only are the digital images stored locally, but they may also be streamed across networks and uploaded to a cloud-based service as computer vision assets for analysis and computer vision processing.

Generally, "computer vision" has developed as techniques used for processing, analyzing, and image understanding of information from digital images, or from a sequence of images. For example, customers to a business may be captured in digital images by a business surveillance system, and then uploaded to a cloud-based service for facial recognition, marketing research, and analysis. Similarly, participants in attendance at an event or function may also be captured in digital images that are uploaded to a cloud-based service for processing and analysis. The digital image processing and analysis can be used to identify people, make assumptions about participants and/or consumers, be used for marketing and sales initiatives, and may even be correlated back to user profiles.

Given that digital images are a type of data likely to be transmitted via networks and stored in data stores on an international scale (e.g., Worldwide in the "cloud"), legal issues as to the use of captured images that include unsuspecting people are a concern, particularly in countries, regions, and/or jurisdictions that seek to restrict the use of these types of images, which may include people having had their picture captured and used without their consent. Notably, in some areas, a person's image captured in a photo is owned by that person, and cannot be used without consent from the person, particularly if the image of the person is stored and/or transmitted. Generally, it is impractical to attempt collecting signed waivers from each person whose image may be captured in a business or public venue, and potentially be processed as a computer vision asset.

In aspects of the described opting-in or opting-out of visual tracking, a person can select and use a visual tracking identifier as a way to indicate a preference for opting-out of visual tracking or opting-in to visual tracking, such as for computer vision processing of captured digital images that might include an image of the person's face. As used herein, the term "opt-out" (and variations thereof) indicates an instance of one choosing not to participate in something, such as the visual tracking for computer vision processing. Similarly, the term "opt-in" (and variations thereof) indicates a person choosing to participate or be involved in something, such as the visual tracking for computer vision processing. For example, a person attending a function who will be on-camera can select to wear a visual tracking identifier that has a symbol designed to indicate the preference for opting-out of visual tracking for computer vision processing. Alternatively, a person attending the function who will be on-camera can select to wear a visual tracking identifier that has a symbol designed to indicate the preference for opting-in to visual tracking for computer vision processing. As described herein, a symbol designed to indicate a preference of a person for opting-in or opting-out of visual tracking can be any type of image or graphic that is identifiable and distinguishes or represents the preference of the person.

Accordingly, a person can explicitly agree or disagree to having his or her image (e.g., the face of the person) processed and analyzed in a digital image in which the person's face may have been captured while in attendance at a function or event that is on-camera. The person can easily opt-out or opt-in for visual tracking and computer vision processing in a way that does not detract from the user experience of attending the function or event. Further, negative legal implications can be avoided or minimized by having the preference of a person being determined as part of the image processing, such as to determine a person's willingness or preference to participate in visual tracking for computer vision processing, needing no signature, but rather only a gesture or visual tracking identifier. The techniques for opting-in or opting-out of visual tracking integrate with existing computer vision processing tasks and the preference of a person can be determined as part of the image processing, which efficiently and easily accommodates people who are in an area on-camera and may be captured in digital images and/or in recorded video.

As noted above, a visual identifier that indicates a preference of a person for opting-in or opting-out of visual tracking can be any type of image or graphic that is identifiable and distinguishes or represents the preference of the person. Notably, the visual identifier would not be just any image or graphic, but rather a symbol specifically designed to be readily identifiable from the technological standpoint of using an image detection and recognition system, such as described herein using trained classifiers. A visual identifier is designed to be high contrast so that it can be detected and recognized in low lighting, bright lighting, and at different viewpoint angles. A visual identifier can also be set on a matte background to reduce or eliminate reflections. Additionally, a visual identifier may designed black on white with a black ridge around the outside, or with an inverse of the color scheme. This allows someone to select the visual identifier with the highest contrast relative to what they are wearing (e.g., a person wearing white can select a black symbol as the visual identifier with a black rim, creating a detectable edge between the clothing and the visual identifier).

Generally, the trained classifiers may be implemented using Haar feature-based cascade classifiers, and the cascade function can be trained from image data sets of positive and negative images, and then used to detect the visual tracking identifiers as objects in digital images. Training on the inverse color options (e.g., black on white or white on black) can also simplify the training of the classifiers, where an inverse can be applied to an entire image, allowing for training of both types without additional positives. Training of the trained classifiers can be performed with various images depicting the visual tracking identifiers in different lighting conditions and at different angles of the visual tracking identifiers, as well as with varying intensity backgrounds. Negative images that do not contain a visual tracking identifier are supplemented as possible backgrounds, to which the visual tracking identifiers can be superimposed over. The negative background images can further include faces and people, as these are the most likely surroundings to be visually opted-out.

It should be noted that, although the visual tracking identifiers are described herein as something that a person selects and wears, such as a button or visual artifact, a visual tracking identifier and/or the symbols that indicate the preference of a person for opting-in or opting-out of visual tracking may be communicated as a gesture by a person, or may be indicated or communicated in any other manner that is detectable in a digital image or in digital video image frames. Further, it should be noted that an event or function may be setup as an opt-in by default or as an opt-out by default environment, where a person may opt-in or opt-out of visual tracking by default and without having to display or wear any visual tracking identifier.

While features and concepts of opting-in or opting-out of visual tracking can be implemented in any number of different devices, systems, networks, environments, and/or configurations, implementations of opting-in or opting-out of visual tracking are described in the context of the following example devices, systems, and methods.

Figure 1:
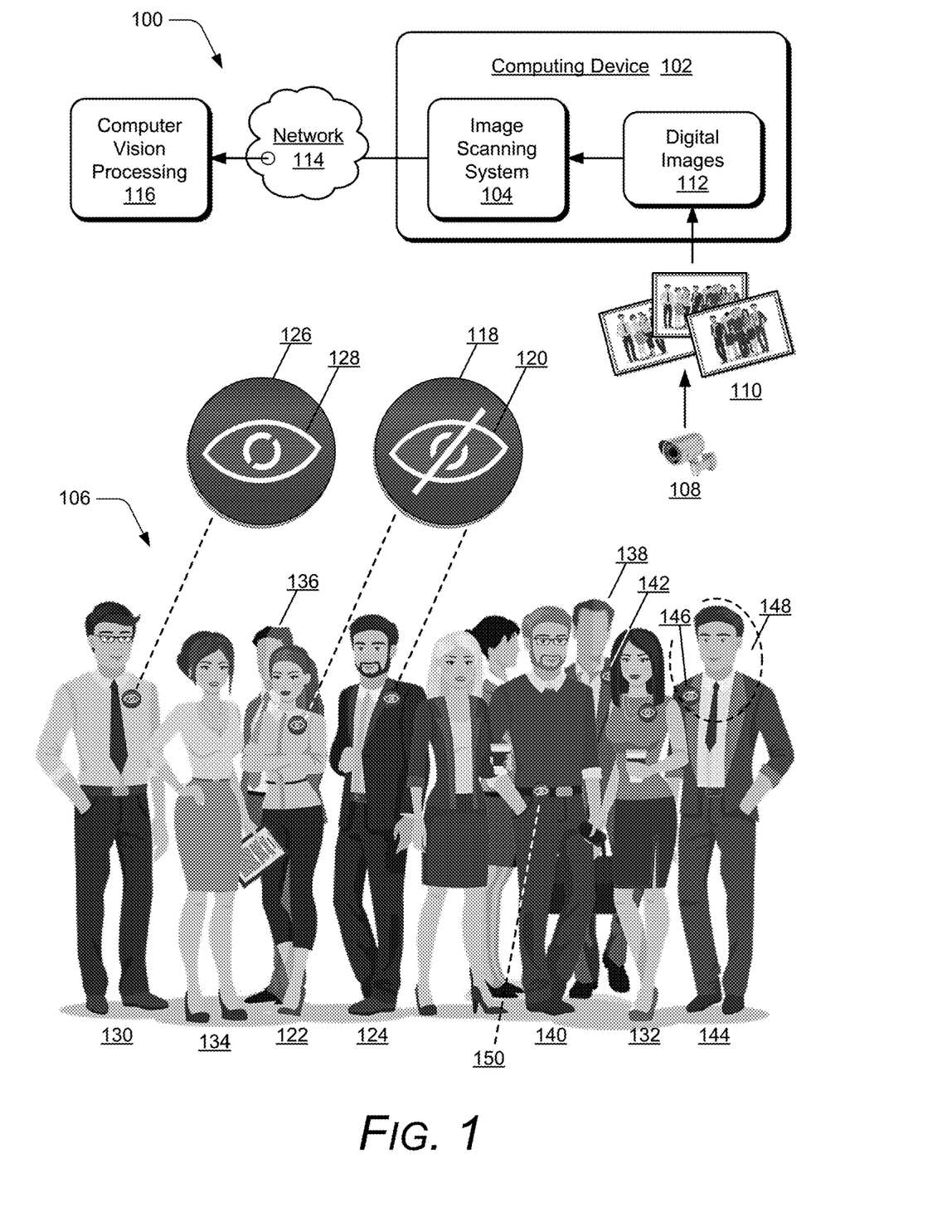
FIG. 1 illustrates an example environment in which aspects of opting-in or opting-out of visual tracking can be implemented.

FIG. 1 illustrates an example environment 100 in which aspects of opting-in or opting-out of visual tracking can be implemented. The example environment 100 includes a computing device 102 that implements an image scanning system 104, which implements features of opting-out of visual tracking or opting-in to visual tracking as described herein. In the example environment 100, a group of people 106 are gathered together, such as participants in attendance at a public or private function, at a seminar, or other event and they are on-camera. Generally, a public building or business includes surveillance cameras, such as a camera device 108, as well as monitoring devices and any other type of networked computing and/or electronic devices included in a surveillance system.

The camera device 108 may capture digital images 110 of the event and the participants, and the digital images are then communicated to the computing device 102, which receives and maintains the captured images as the digital images 112 for analysis and image processing. In this example, the computing device 102 is associated with the building or business in which the digital images 110 of the people 106 are captured. Although described in the context of the captured digital images 110, the camera device 108 of a surveillance system or other type of monitoring system can also be implemented to record digital video as a sequence of digital image frames that can also be analyzed and processed as described herein.

As noted above, the digital images 110 of the event and the participants may be captured and not only communicated to the computing device 102, but may also be streamed across networks, such as network 114, and uploaded to a cloud-based service as computer vision assets for analysis and computer vision processing 116. Generally, "computer vision" has developed as techniques used for processing, analyzing, and image understanding of information from digital images, or from a sequence of images. For example, customers to a business may be captured in digital images by a business surveillance system, and then uploaded to a cloud-based service for facial recognition, marketing research, and analysis. Similarly, participants in attendance at an event or function may also be captured in digital images that are uploaded to a cloud-based service for processing and analysis. The digital image processing and analysis can be used to identify people, make assumptions about participants and/or consumers, be used for marketing and sales initiatives, and may even be correlated back to user profiles.

Given that digital images are a type of data likely to be transmitted via networks and stored in data stores on an international scale (e.g., Worldwide in the "cloud"), legal issues as to the use of captured images that include unsuspecting people are a concern, particularly in countries, regions, and/or jurisdictions that seek to restrict the use of these types of images, which may include people having had their picture captured and used without their consent. Notably, in some areas, a person's image captured in a photo is owned by that person, and cannot be used without consent from the person, particularly if the image of the person is stored and/or transmitted. Generally, it is impractical to attempt collecting signed waivers from each person whose image may be captured in a business or public venue, and potentially be processed as a computer vision asset.

In aspects of the described opting-in or opting-out of visual tracking, a person can select and use a visual tracking identifier as a way to indicate a preference for opting-out of visual tracking or opting-in to visual tracking, such as for computer vision processing of captured digital images that might include an image of the person's face. For example, a person attending a function who will be on-camera can select to wear a visual tracking identifier 118 that has a symbol 120 designed to indicate the preference for opting-out of visual tracking. In the example environment 100, the woman 122 and the man 124 in the group of people 106 indicate their respective preferences for opting-out of visual tracking by wearing and/or displaying the visual tracking identifier 118 with the symbol 120 that indicates the preference for opting-out. Alternatively, a person attending the function who will be on-camera can select to wear a visual tracking identifier 126 that has a symbol 128 designed to indicate the preference for opting-in to visual tracking for computer vision processing. In the example environment 100, the man 130 and the woman 132 in the group of people 106 indicate their respective preferences for opting-in to visual tracking by wearing and/or displaying the visual tracking identifier 126 with the symbol 128 that indicates the preference for opting-in.

Accordingly, a person can explicitly agree or disagree to having his or her image (e.g., the face of the person) processed and analyzed in a digital image in which the person's face may have been captured while in attendance at a function or event that is on-camera. The person can easily opt-out or opt-in for visual tracking and computer vision processing in a way that does not detract from the user experience of attending the function or event. Further, negative legal implications can be avoided or minimized by having the preference of a person being determined as part of the image processing, such as to determine a person's willingness or preference to participate in visual tracking for computer vision processing, needing no signature, but rather only a gesture or visual tracking identifier.

It should be noted that, although the visual tracking identifiers are described herein as something that a person selects and wears, such as a button or visual artifact, a visual tracking identifier and/or the symbols that indicate the preference of a person for opting-in or opting-out of visual tracking may be communicated as a gesture by a person, may be sewn into the lapel of an article of clothing or on a hat, may be worn as a necklace pendant, earring design, or other jewelry item, and/or may be indicated or communicated in any other manner that is detectable in a digital image or in digital video image frames. Further, it should be noted that an event or function may be setup as an opt-in by default or as an opt-out by default environment, where a person may opt-in or opt-out of visual tracking by default and without having to display or wear any visual tracking identifier.

For example, the group of people 106 in the example environment 100 may be provided the option to select and wear the visual tracking identifier 118 with the symbol 120 designed to indicate the preference for opting-out from visual tracking in an opt-in by default environment. If a person chooses not to opt-out of visual tracking by not displaying the visual tracking identifier 118, then the person opts-in by default and the captured digital images 110 that include the person may be usable for computer vision processing. For example, the woman 134 is not displaying (e.g., not wearing) a visual tracking identifier, and in the opt-in by default environment, she is implicitly opting-in to visual tracking for computer vision processing.

Alternatively, the group of people 106 may be provided the option to select and wear the visual tracking identifier 126 with the symbol 128 designed to indicate the preference for opting-in to visual tracking in an opt-out by default environment. If a person chooses not to opt-in to visual tracking by not displaying the visual tracking identifier 126, then the person opts-out by default and any image of the person in the captured digital images 110 is discarded and will not be used for computer vision processing. For example, the woman 134 is not displaying (e.g., not wearing) a visual tracking identifier, and in the opt-out by default environment, she is implicitly opting-out of visual tracking for computer vision processing. Notably, the image of the person (e.g., the face of the person) is discarded and/or cropped from a digital image, and will not be used, but the rest of a digital image 110 may still be usable for computer vision processing.

Generally, providing the group of people 106 the option to opt-in for visual tracking (e.g., opt-out by default) is more restrictive from the standpoint that it provides a person will not be included in digital images for computer vision processing unless the person can be clearly detected in a digital image along with the visual tracking identifier 126 having the symbol 128 designed to indicate the preference for opting-in to visual tracking. For example, the man 136 standing behind the two women 122 and 134 is partially obscured from view, and in some of the digital images 110, his face may or may not be detectable. Further, there is no clear indication as to whether the man 136 is wearing a visual tracking identifier, such as to opt-in for visual tracking. He may be wearing a visual tracking identifier 126 having the symbol 128 to indicate his preference to opt-in for visual tracking, however, given that the visual tracking identifier is blocked from view and would not be detectable in a digital image 110 that includes the man, he will be identified as opting-out by default. This serves to avoid using any image of the man 136 until it can be confirmed that his preference is to opt-in for visual tracking.

Similarly, the man 138 standing behind the woman 132 and the man 140 is partially obscured from view, and in particular, his visual tracking identifier 142 is also obscured. Although his face will likely be detectable in some of the digital images 110 as he is currently positioned, his visual tracking identifier 142 may not be fully detectable with enough confidence to determine that he is opting-in (e.g., wearing a visual tracking identifier 126) or opting-out (e.g., wearing a visual tracking identifier 118). Accordingly, he will be identified as opting-out by default so as to avoid using any image of the man 138 until his visual tracking identifier 142 can be detected with confidence indicating that his preference is to opt-in for visual tracking.

As shown and described in more detail with reference to FIG. 2, the image scanning system 104 is implemented to detect the face of a person who is depicted in a digital image from a scan of the digital image, and scan the digital image for a visual tracking identifier that indicates a preference of the person for opting-in or opting-out of visual tracking for computer vision processing. In an implementation, the digital image is scanned for the visual tracking identifier within a vicinity of the face of the person, such as in a region within a determined distance from the face of the person. For example, the face of the man 144 who is displaying or wearing a visual tracking identifier 146 may be detected in a digital image 110, and the digital image is then scanned in a region 148 within a determined distance from the face of the person to detect the visual tracking identifier. In this example, the visual tracking identifier 146 is detectable within the region 148 and will be detected by the image scanning system. In another example, the man 140 has chosen to display or wear his visual tracking identifier 150 in the region of his waist on his belt, in which case the visual tracking identifier may not be detected by the image scanning system due to the position of the visual tracking identifier being outside of a region within the vicinity of the face of the person.

Any of the devices, servers, and/or services described herein can communicate via the network 114, such as for data communication between the computing device 102 and a system for the computer vision processing 116. The network 114 can be implemented to include a wired and/or a wireless network. The network can also be implemented using any type of network topology and/or communication protocol, and can be represented or otherwise implemented as a combination of two or more networks, to include IP-based networks and/or the Internet. The network 114 may also include mobile operator networks that are managed by a mobile network operator and/or other network operators, such as a communication service provider, mobile phone provider, and/or Internet service provider.

Figure 2:
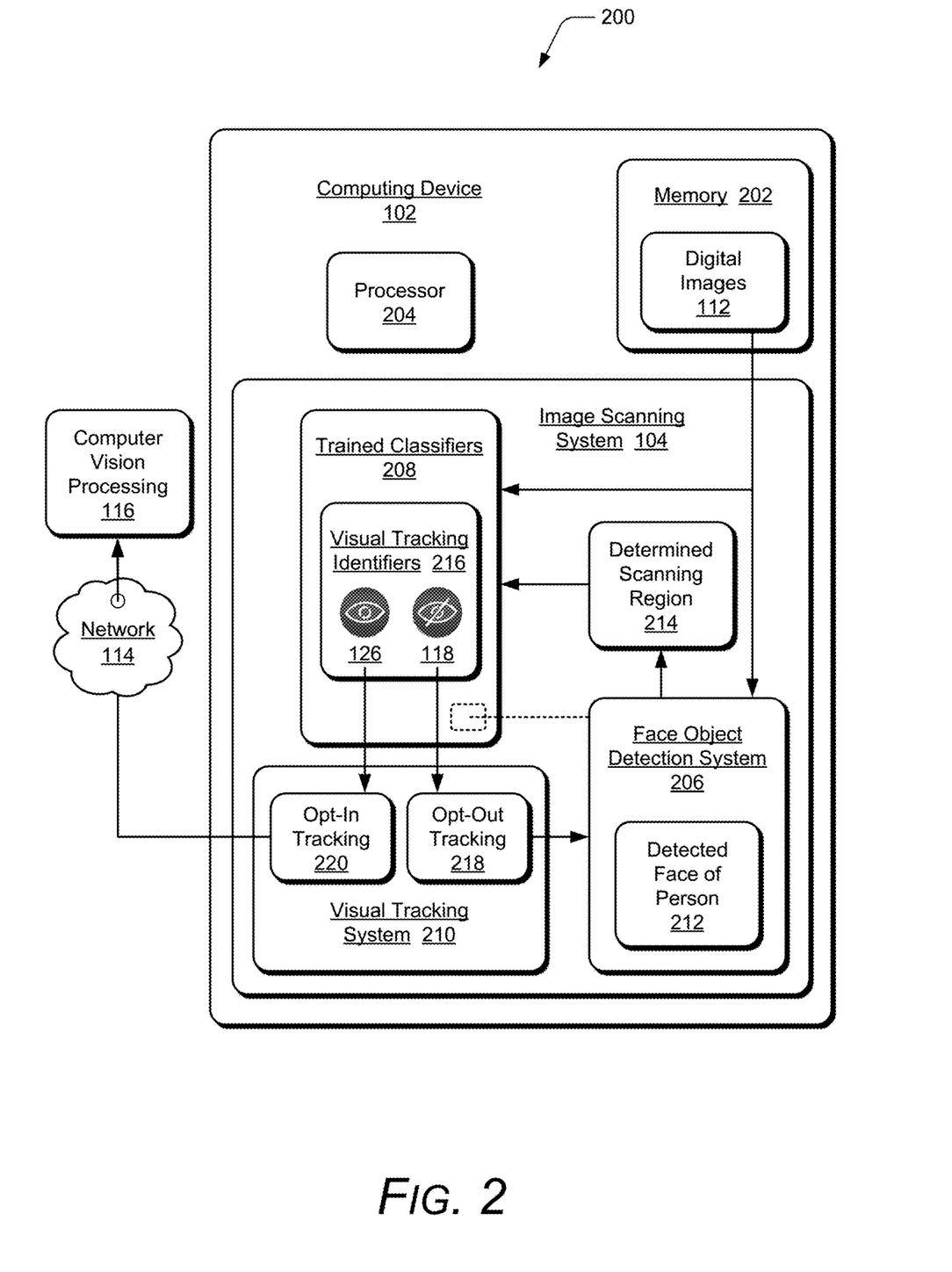
FIG. 2 illustrates an example implementation of an image scanning system for determining opting-in or opting-out of visual tracking in accordance with one or more implementations.

FIG. 2 illustrates an example implementation 200 of the image scanning system 104 implemented with the computing device 102 in aspects of opting-in or opting-out of visual tracking. Although shown and described as a component or system of the computing device 102, the image scanning system 104 may also be implemented as a cloud-based service system as shown and described with reference to FIG. 5. In this example implementation 200, the computing device 102 includes memory 202, which maintains the received digital images 112, as well as a processor 204, and may include any number and combination of different components as further described with reference to the example device shown in FIG. 6.

The computing device 102 implements the image scanning system 104, such as in software, in hardware, or as a combination of software and hardware components. In this example, the image scanning system 104 is implemented as a software application or modules, such as executable software instructions (e.g., computer-executable instructions) that are executable with a processing system (e.g., the processor 204) of the computing device 102 to implement the techniques of opting-in or opting-out of visual tracking. The image scanning system 104 can be stored on computer-readable storage media, such as any suitable memory device (e.g., the device memory 202) or electronic data storage implemented in the computing device 102.

In this example implementation 200, the image scanning system 104 includes a face object detection system 206, a system of trained classifiers 208, and a visual tracking system 210. In implementations, the trained classifiers 208 may be implemented as Haar cascade classifiers. The image scanning system 104 maintains the digital images 112, such as described with reference to the example environment 100, that are received from the camera device 108 that captures the digital images 110 of an event and the participants (e.g., the group of people 106), and the digital images are communicated to the computing device 102 for storage, analysis, and image processing. The face object detection system 206 of the image scanning system 104 can be utilized to scan a digital image 112 and detect a face of a person 212 who is depicted in the digital image. Although shown and described as separate components, the face object detection system 206 may also be implemented as trained classifiers 208, such as Haar cascade classifiers, to scan and detect the face of a person who is depicted in a digital image.

When the face of the person 212 is detected in the digital image 112, the image scanning system 104 can determine a scanning region 214 within a distance from the detected face of the person in which to scan the digital image for a visual tracking identifier that is associated with the person. In the example environment 100 described above, the face of the man 144 who is displaying or wearing the visual tracking identifier 146 may be detected in a digital image 112. The scanning region 148 in a vicinity around the face of the person is determined by the image scanning system 104 as a distance from the face of the person for the region in which to scan the digital image 112 for the visual tracking identifier that is associated with the person. In implementations, the size of the determined scanning region 214 can be based on a resolution of the image and/or based on the relative face dimensions of the person detected in the digital image. For example, the scanning region 214 may be determined to include a region below the detected face of the person 212 that is two or three times the vertical height of the person's face in the image, and the region is one-half or one times wider than the width of the person's face in the image. Notably, any size of region in a digital image may be established within which to search for a visual tracking identifier associated with a detected face of a person in the digital image.

The image scanning system 104 can input the digital image 112 in which the face of the person 212 has been detected, along with the determined scanning region 214, to the trained classifiers 208, which are utilized to scan the digital image 112 for a visual tracking identifier that indicates a preference of the person for one of opting-in or opting-out of visual tracking for computer vision processing. The trained classifiers 208 can scan the digital image 112 for a visual tracking identifier within a vicinity of the face of the person 212, such as within the distance from the face of the person defined by the determined scanning region 214. The trained classifiers 208 can then detect a visual tracking identifier 216 that is associated with the detected person 212 based on the scanning of the digital image. For example, the trained classifiers 208 may detect that the person is wearing or displaying the visual tracking identifier 118 with the symbol 120 designed to indicate the preference for opting-out of visual tracking. Alternatively, the trained classifiers 208 may detect that the person is wearing or displaying the visual tracking identifier 126 with the symbol 128 designed to indicate the preference for opting-in to visual tracking for computer vision processing.

Generally, the trained classifiers 208 can be implemented for object detection using Haar feature-based cascade classifiers. The cascade function can be implemented as a machine learning-based approach, and trained from image data sets of positive and negative images, and then used to detect the visual tracking identifiers as the objects in the digital images 112. Training of the trained classifiers 208 is performed with various images depicting the visual tracking identifiers 216 in different lighting conditions and at different angles of the visual tracking identifiers, as well as with varying intensity backgrounds. Negative images that do not contain a visual tracking identifier are supplemented as possible backgrounds, to which the visual tracking identifiers can be superimposed over. The negative background images can further include faces and people, as these are the most likely surroundings to be visually opted-out.

When the trained classifiers 208 are trained as a boosted Haar cascade, it has defined Haar-like features for edge, line, and feature detection, which is highly accurate with the types of symbols 120 and 128 shown on the respective visual tracking identifiers 118 and 126. In implementations, the trained classifiers 208 can be exported as a data file (e.g., such as an XML file), and imported into any system that performs face and visual tracking identifier detection, such as the image scanning system 104. The trained classifiers 208 can be applied to images by using integral images to quickly add the edge, line, and features, and ultimately determine the likelihood that a digital image 112 image depicts an opt-in or opt-out visual tracking identifier.

The visual tracking system 210 of the image scanning system 104 can receive the detected visual tracking identifier 216 from the trained classifiers 208. The visual tracking system 210 is implemented to initiate opt-out tracking 218 of the detected person 212 who is wearing or displaying the visual tracking identifier 118 that has the symbol 120 for opting-out of visual tracking. Alternatively, the visual tracking system 210 is also implemented to initiate opt-in tracking 220 of the detected person 212 who is wearing or displaying the visual tracking identifier 126 that has the symbol 128 for opting-in to visual tracking for the computer vision processing 116. As indicated in the example environment 100, the digital images 112 that include faces of people may be captured and streamed across networks, such as network 114, and uploaded to a cloud-based service as computer vision assets for analysis and computer vision processing 116. Generally, "computer vision" includes techniques used for processing, analyzing, and image understanding of information from digital images, or from a sequence of images, such as for facial recognition, marketing research, and analysis.

In implementations, the visual tracking system 210 can utilize a tracker algorithm, such as a kernelized correlation filter (KCF) tracker, to keep track of a detected face of a person 212 that has been identified for opt-in tracking 220 based on a detected visual tracking identifier 126 that indicates the person opts-in to visual tracking for the computer vision processing 116. Similarly, the visual tracking system 210 can utilize a KCF tracker to keep track of a detected face of a person 212 that has been identified for opt-out tracking 218 based on a detected visual tracking identifier 118 that indicates the person opts-out of visual tracking. The visual tracking system 210 of the image scanning system 104 can discontinue the visual tracking of the detected person 212 based on the visual tracking identifier 118 that indicates a preference to opt-out of visual tracking for computer vision processing. Similarly, the visual tracking system 210 can default to the opt-out tracking 218 if a visual tracking identifier 216 is not distinguishable in the digital image 112 so as to indicate that the person opts-in to visual tracking. This serves to avoid using any image of the person until it can be confirmed that the preference is to opt-in for visual tracking. Notably, the image of the person (e.g., the face of the person) is discarded and/or cropped from a digital image, and will not be used, but the rest of a digital image 110 may still be usable for computer vision processing.

Example methods 300 and 400 are described with reference to respective FIGS. 3 and 4 in accordance with one or more aspects of opting-in or opting-out of visual tracking. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
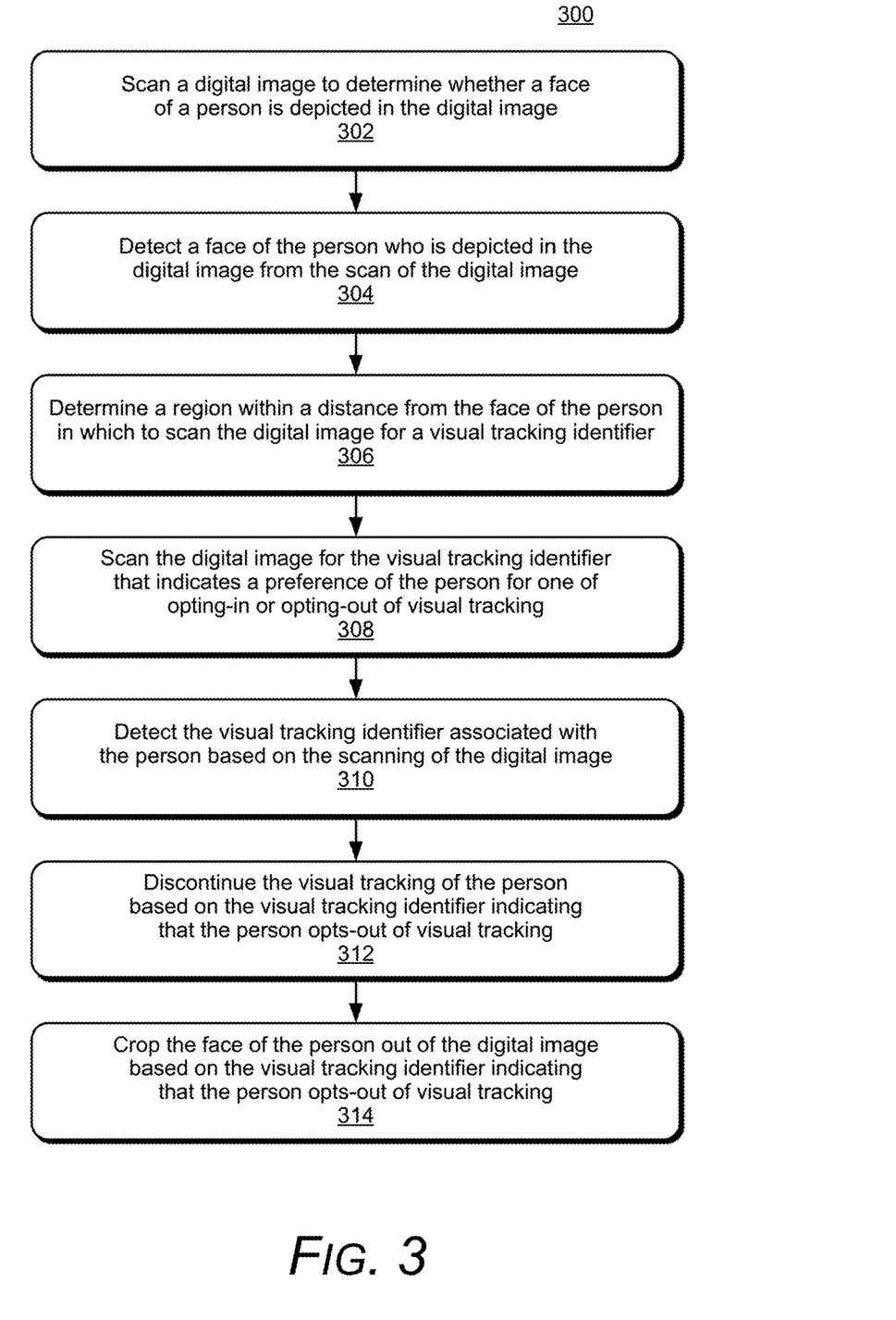
FIG. 3 illustrates an example method of opting-in or opting-out of visual tracking in accordance with one or more implementations.

FIG. 3 illustrates example method(s) 300 for opting-in or opting-out of visual tracking, and is generally described with reference to the image scanning system as shown and described with reference to FIGS. 1 and 2. The order in which the method is described is not intended to be construed as a limitation, and any number or combination of the method operations can be combined in any order to implement a method, or an alternate method.

At 302, a digital image is scanned to determine whether a face of a person is depicted in the digital image. For example, the image scanning system 104 that is implemented with the computing device 102 utilizes the face object detection system 206 to scan a digital image 112 and detect a face of a person 212 who is depicted in the digital image. In implementations, the face object detection system 206 may be implemented as trained classifiers 208 (e.g., Haar cascade classifiers) to scan and detect the face of a person who is depicted in a digital image. The image scanning system 104 maintains the digital images 112, such as described with reference to the example environment 100, that are received from the camera device 108 that captures the digital images 110 of an event and the participants (e.g., the group of people 106), and the digital images are communicated to the computing device 102 for storage, analysis, and image processing.

At 304 a face of the person who is depicted in the digital image is detected from the scan of the digital image. For example, the face object detection system 206 of the image scanning system 104 detects the face of the person 212 who is depicted in the digital image. In the example environment 100, the face of the man 144 can be detected by the face object detection system 206 of the image scanning system 104 in the digital images 112 that are maintained at the computing device 102, and received as the digital images 110 from the camera device 108.

At 306, a region is determined within a distance from the face of the person in which to scan the digital image for a visual tracking identifier. For example, the image scanning system 104 determines the scanning region 214 within a distance from the detected face of the person 212 in which to scan the digital image for a visual tracking identifier that is associated with the person. In the example environment 100, the face of the man 144 who is displaying or wearing the visual tracking identifier 146 may be detected in a digital image 112. The determined scanning region 148 in a vicinity around the face of the person is determined by the image scanning system 104 as a distance from the face of the person for the region in which to scan the digital image 112 for the visual tracking identifier 146 that is associated with the person. In implementations, the size of the determined scanning region 214 can be based on a resolution of the image and/or based on the relative face dimensions of the person detected in the digital image.

At 308, the digital image is scanned for the visual tracking identifier that indicates a preference of the person for one of opting-in or opting-out of visual tracking. For example, the trained classifiers 208 of the image scanning system 104 scan the digital image 112 for a visual tracking identifier that indicates a preference of the person for one of opting-in or opting-out of visual tracking for computer vision processing. The trained classifiers 208 can scan the digital image 112 for a visual tracking identifier within a vicinity of the face of the person 212, such as within the distance from the face of the person defined by the determined scanning region 214. In the example environment 100, the digital image that depicts the face of the man 144 is scanned in the region 148 within a determined distance from the face of the person to detect the visual tracking identifier 146 that is associated with the person and detectable within the region 148.

At 310, the visual tracking identifier that is associated with the person is detected based on the scanning of the digital image. For example, the trained classifiers 208 of the image scanning system 104 detect a visual tracking identifier 216 that is associated with the detected person 212 based on the scanning of the digital image. The trained classifiers 208 can detect that the person is wearing or displaying the visual tracking identifier 118 with the symbol 120 designed to indicate the preference for opting-out of visual tracking for computer vision processing. In the example environment 100, the trained classifiers 208 can detect that the man 144 is wearing or displaying the visual tracking identifier 146 with the symbol 120 to indicate his preference for opting-out of visual tracking.

At 312, the visual tracking of the person is discontinued based on the visual tracking identifier indicating that the person opts-out of visual tracking. For example, the visual tracking system 210 of the image scanning system 104 initiates the opt-out tracking 218 of the detected person 212 who is wearing or displaying the visual tracking identifier 118 that has the symbol 120 for opting-out of visual tracking. The image scanning system 104 discontinues the visual tracking of the detected person 212 for computer vision processing.

At 314, the face of the person is cropped out of the digital image based on the visual tracking identifier indicating that the person opts-out of visual tracking. For example, the image scanning system 104 crops the face of the person 212 out of the digital image 112 based on the visual tracking identifier 118 indicating that the person 212 opts-out of visual tracking. Notably, the image of the person (e.g., the face of the person 212) is discarded and/or cropped from a digital image, and will not be used, but the rest of the digital image 112 may still be usable for computer vision processing.

Figure 4:
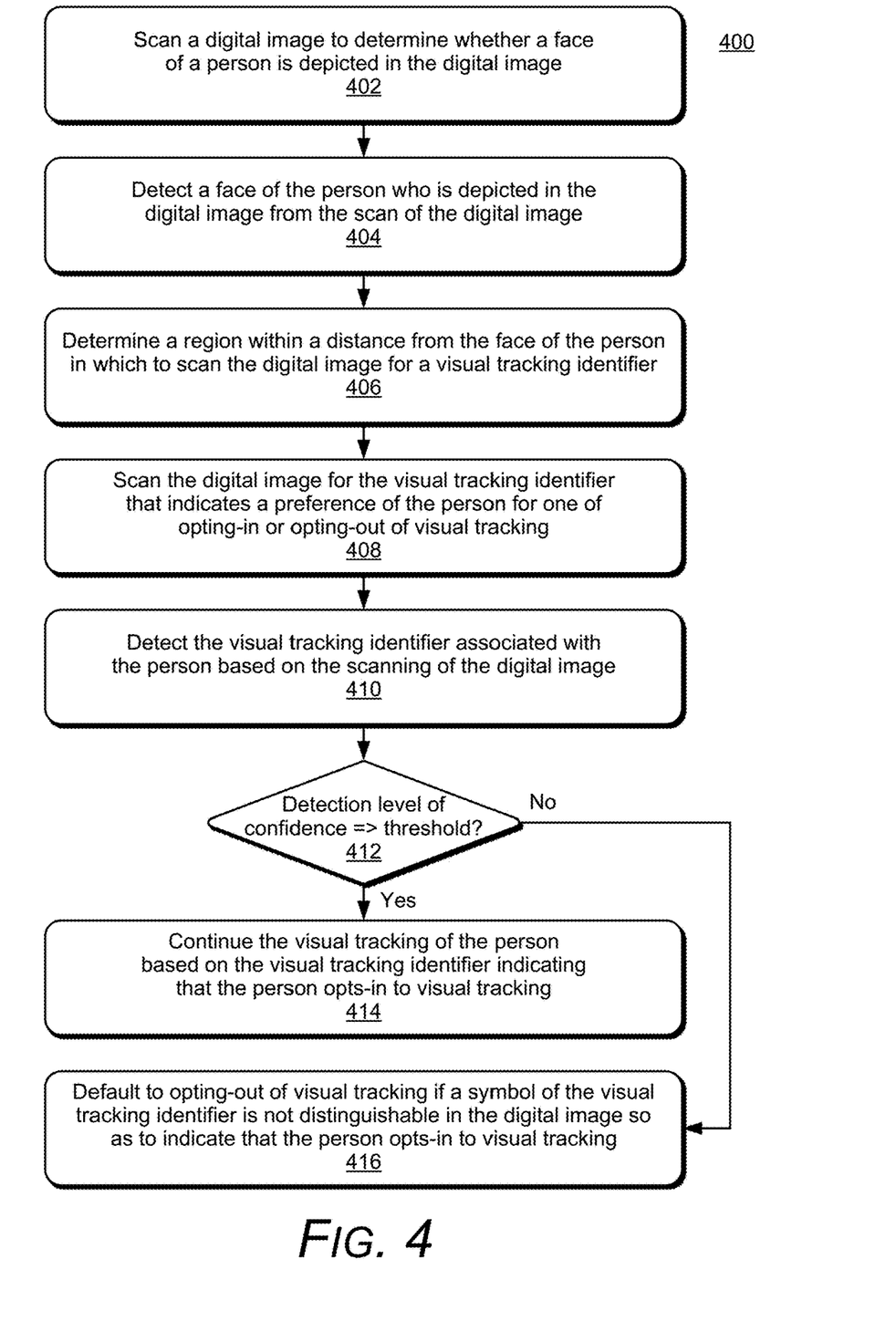
FIG. 4 illustrates an example method of opting-in or opting-out of visual tracking in accordance with one or more implementations.

FIG. 4 illustrates example method(s) 400 for opting-in or opting-out of visual tracking, and is generally described with reference to the image scanning system as shown and described with reference to FIGS. 1 and 2. The order in which the method is described is not intended to be construed as a limitation, and any number or combination of the method operations can be combined in any order to implement a method, or an alternate method.

At 402, a digital image is scanned to determine whether a face of a person is depicted in the digital image. For example, the image scanning system 104 that is implemented with the computing device 102 utilizes the face object detection system 206 to scan a digital image 112 and detect a face of a person 212 who is depicted in the digital image. In implementations, the face object detection system 206 may be implemented as trained classifiers 208 (e.g., Haar cascade classifiers) to scan and detect the face of a person who is depicted in a digital image. The image scanning system 104 maintains the digital images 112, such as described with reference to the example environment 100, that are received from the camera device 108 that captures the digital images 110 of an event and the participants (e.g., the group of people 106), and the digital images are communicated to the computing device 102 for storage, analysis, and image processing.

At 404, a face of the person who is depicted in the digital image is detected from the scan of the digital image. For example, the face object detection system 206 of the image scanning system 104 detects the face of the person 212 who is depicted in the digital image. In the example environment 100, the face of the man 144 can be detected by the face object detection system 206 of the image scanning system 104 in the digital images 112 that are maintained at the computing device 102, and received as the digital images 110 from the camera device 108.

At 406, a region is determined within a distance from the face of the person in which to scan the digital image for a visual tracking identifier. For example, the image scanning system 104 determines the scanning region 214 within a distance from the detected face of the person 212 in which to scan the digital image for a visual tracking identifier that is associated with the person. In the example environment 100, the face of the man 144 who is displaying or wearing the visual tracking identifier 146 may be detected in a digital image 112. The determined scanning region 148 in a vicinity around the face of the person is determined by the image scanning system 104 as a distance from the face of the person for the region in which to scan the digital image 112 for the visual tracking identifier 146 that is associated with the person. In implementations, the size of the determined scanning region 214 can be based on a resolution of the image and/or based on the relative face dimensions of the person detected in the digital image.

At 408, the digital image is scanned for a visual tracking identifier that indicates a preference of the person for one of opting-in or opting-out of visual tracking. For example, the trained classifiers 208 of the image scanning system 104 scan the digital image 112 for a visual tracking identifier that indicates a preference of the person for one of opting-in or opting-out of visual tracking for computer vision processing. The trained classifiers 208 can scan the digital image 112 for a visual tracking identifier within a vicinity of the face of the person 212, such as within the distance from the face of the person defined by the determined scanning region 214. In the example environment 100, the digital image that depicts the face of the man 144 is scanned in the region 148 within a determined distance from the face of the person to detect the visual tracking identifier 146 that is associated with the person and detectable within the region 148.

At 410, the visual tracking identifier that is associated with the person is detected based on the scanning of the digital image. For example, the trained classifiers 208 of the image scanning system 104 detect a visual tracking identifier 216 that is associated with the detected person 212 based on the scanning of the digital image. The trained classifiers 208 can detect that the person is wearing or displaying the visual tracking identifier 126 with the symbol 128 designed to indicate the preference for opting-in to visual tracking for computer vision processing. In the example environment 100, the trained classifiers 208 can detect that the woman 132 is wearing or displaying a visual tracking identifier with the symbol 128 to indicate her preference for opting-in to visual tracking.

At 412, a determination is made as to a level of confidence meeting or exceeding a threshold that the detected visual tracking identifier includes the symbol indicating the preference for opting-in to visual tracking. For example, the image scanning system 104 determines a level of confidence in meeting or exceeding a threshold that the detected visual tracking identifier 216 includes the symbol 128 indicating the preference for opting-in to visual tracking. Generally, providing the option to opt-in for visual tracking (e.g., opt-out by default) is more restrictive from the standpoint that it provides a person will not be included in digital images for computer vision processing unless the person can be clearly detected in a digital image along with the visual tracking identifier 126 having the symbol 128 designed to indicate the preference for opting-in to visual tracking. This serves to avoid using any image of the person until it can be confirmed that the preference is to opt-in for visual tracking.

If the detection level of confidence does meet or exceed the threshold that the visual tracking identifier indicates the preference for opting-in to visual tracking (i.e., "Yes" from 412), then at 414, the visual tracking of the person is continued based on the visual tracking identifier indicating that the person opts-in to visual tracking. For example, the visual tracking system 210 of the image scanning system 104 initiates the opt-in tracking 220 of the detected person 212 who is wearing or displaying the visual tracking identifier 126 that has the symbol 128 for opting-in to visual tracking. The image scanning system 104 continues the visual tracking of the detected person 212 for computer vision processing.

If the detection level of confidence does not meet or exceed the threshold that the visual tracking identifier indicates the preference for opting-in to visual tracking (i.e., "No" from 412), then at 416, the default is to opt-out of visual tracking of the person if the symbol of the visual tracking identifier is not distinguishable in the digital image so as to indicate that the person opts-in to the visual tracking. For example, the image scanning system 104 discontinues visual tracking of the detected person 212 based on the visual tracking identifier that is associated with the person not being fully detectable with enough confidence to determine that the person is opting-in. In the example environment 100, the man 138 who is standing behind the woman 132 and the man 140 is partially obscured from view, and in particular, his visual tracking identifier 142 is also obscured. Although his face will likely be detectable in some of the digital images 110 as he is currently positioned, his visual tracking identifier 142 may not be fully detectable with enough confidence to determine that he is opting-in (e.g., wearing a visual tracking identifier 126) or opting-out (e.g., wearing a visual tracking identifier 118). Accordingly, he will be identified as opting-out by default so as to avoid using any image of the man 138 until his visual tracking identifier 142 can be detected with confidence indicating that his preference is to opt-in for visual tracking.

Figure 5:
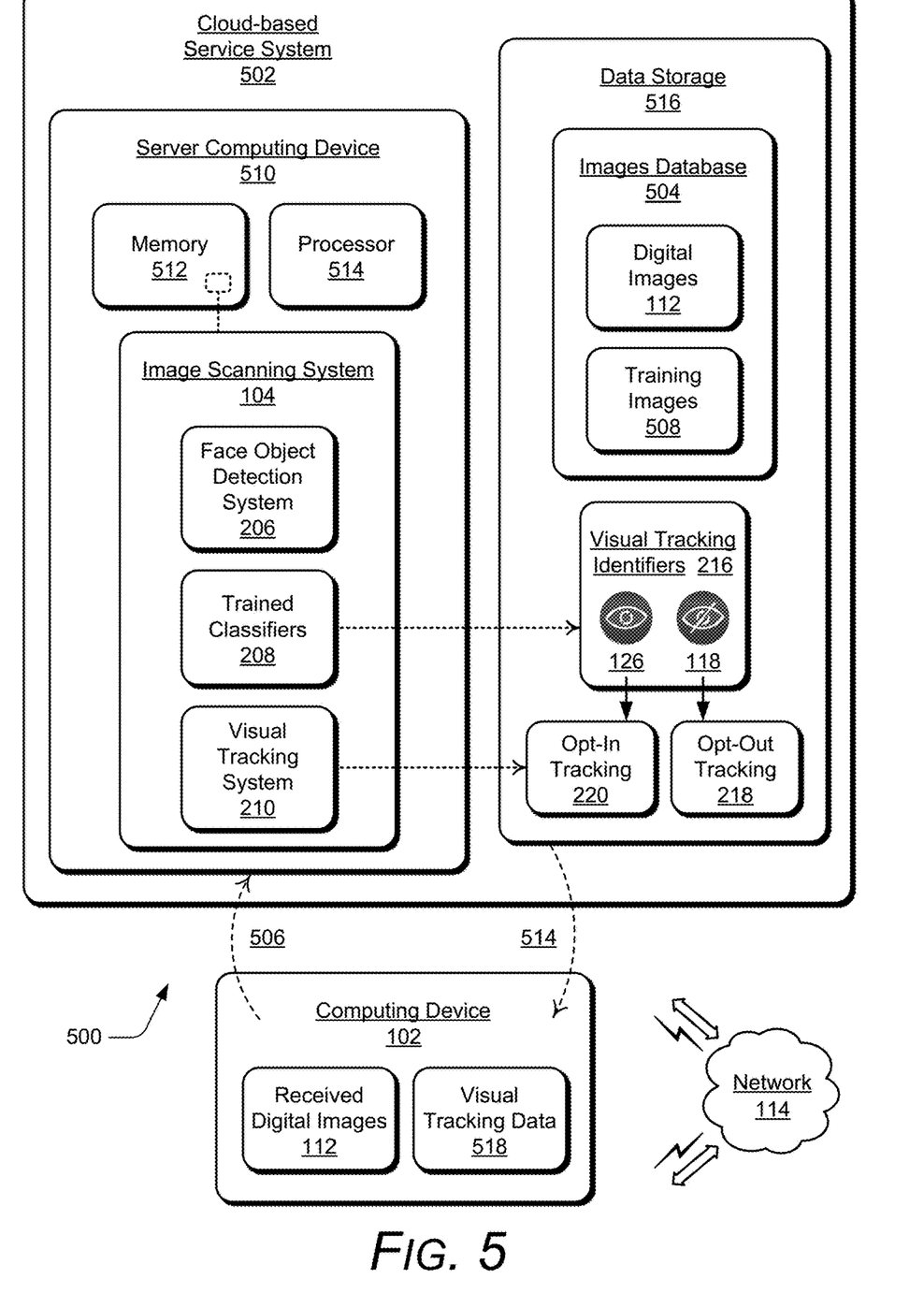
FIG. 5 further illustrates features of an example environment in accordance with one or more aspects of opting-in or opting-out of visual tracking.

FIG. 5 illustrates an example environment 500 that includes features of the image scanning system 104 implemented in a cloud-based service system 502, in which techniques of opting-in or opting-out of visual tracking can be implemented, such as shown and described with reference to FIGS. 1-4. The example environment 500 includes the cloud-based service system 502, which is representative of any number of cloud-based access sites that provide a service and/or from which data and information is available, such as via the Internet, for on-line and/or network-based access. The cloud-based service system 502 is an image service that can be accessed on-line, and includes an images database 504 that maintains the digital images 112, such as received at 506 from the computing device 102. The images database 504 can also include the various training images 508 used for training the trained classifiers 208. In other implementations, the cloud-based service system 502 may be an overall asset service that can be accessed on-line, and includes one or more databases of digital images, graphics, videos, templates, and/or any other type of asset, such as may be made available on a subscription basis for user access.

The example environment 500 includes the cloud-based service system 502, the computing device 102, and the network 114 via which any of the devices, servers, and/or services described herein can communicate. The cloud-based service system 502 includes a server computing device 510, which is representative of one or more hardware server devices (e.g., computing devices) that may be implemented at the cloud-based service system. The server computing device 510 includes memory 512 and a processor 514, and may include any number and combination of different components as further described with reference to the example device shown in FIG. 6.

In this example environment 500, the server computing device 510 implements the image scanning system 104, such as in software, in hardware, or as a combination of software and hardware components. In this example, the image scanning system 104 is implemented as a software application or modules, such as executable software instructions (e.g., computer-executable instructions) that are executable with a processing system (e.g., the processor 514) of the server computing device 510 to implement the techniques of opting-in or opting-out of visual tracking. The image scanning system 104 can be stored on computer-readable storage media, such as any suitable memory device (e.g., the device memory 512) or electronic data storage implemented in the server computing device 510 and/or at the cloud-based service system 502. The cloud-based service system 502 may include multiple data storage, server devices, and applications, and can be implemented with various components as further described with reference to the example device shown in FIG. 6.

The cloud-based service system 502 also includes data storage 516 that may be implemented as any suitable memory, memory device, or electronic data storage for network-based data storage. The data storage 516 is utilized at the cloud-based service system 502 to maintain the images database 504 of the digital images 112, as well as the various training images 508. The data storage 516 can also be utilized at the cloud-based service system 502 to maintain the visual tracking identifiers 216, as detected by the trained classifiers 208, and maintain the data for opt-out tracking 218 and opt-in tracking 220 for each person in the group of people 106 as determined by the visual tracking system 210 of the image scanning system 104.

As shown in this example environment 500, the server computing device 510 implements the image scanning system 104, which includes the face object detection system 206, the trained classifiers 208, and the visual tracking system 210. As described with reference to FIGS. 1-4, the face object detection system 206 can be utilized to scan a digital image 112 and detect a face of a person who is depicted in the digital image. The image scanning system 104 can then determine a scanning region within a distance from the detected face of the person in which to scan the digital image for a visual tracking identifier that is associated with the person. The trained classifiers 208 are utilized to scan the digital image 112 for a visual tracking identifier that indicates a preference of the person for one of opting-in or opting-out of the visual tracking for computer vision processing.

The trained classifiers 208 can scan the digital image 112 for the visual tracking identifier 216 within a vicinity of the face of the person, such as within the distance from the face of the person defined by the determined scanning region. The trained classifiers 208 can then detect the visual tracking identifier 216 that is associated with the detected person 212 based on the scanning of the digital image. For example, the trained classifiers 208 may detect that the person is wearing or displaying the visual tracking identifier 118 with the symbol 120 designed to indicate the preference for opting-out of visual tracking. Alternatively, the trained classifiers 208 may detect that the person is wearing or displaying the visual tracking identifier 126 with the symbol 128 designed to indicate the preference for opting-in to the visual tracking for computer vision processing. As noted above, the trained classifiers 208 can be implemented for object detection using Haar feature-based cascade classifiers. The cascade function can be implemented as a machine learning-based approach, and trained from image data sets (e.g., the training images 508) of positive and negative images, and then used to detect the visual tracking identifiers as the objects in the digital images 112.

The visual tracking system 210 of the image scanning system 104 can receive the detected visual tracking identifier 216 from the trained classifiers 208. The visual tracking system 210 is implemented to initiate opt-out tracking 218 of the detected person 212 who is wearing or displaying the visual tracking identifier 118 that has the symbol 120 for opting-out of visual tracking. Alternatively, the visual tracking system 210 is also implemented to initiate opt-in tracking 220 of the detected person 212 who is wearing or displaying the visual tracking identifier 126 that has the symbol 128 for opting-in to the visual tracking for the computer vision processing 116. In implementations, the visual tracking system 210 can utilize a kernelized correlation filter (KCF) tracker to keep track of a detected face of a person that has been identified for opt-in tracking 220 or for opt-out tracking 218. The visual tracking data 518 can then be communicated at 520 back to the computing device 102.

Figure 6:
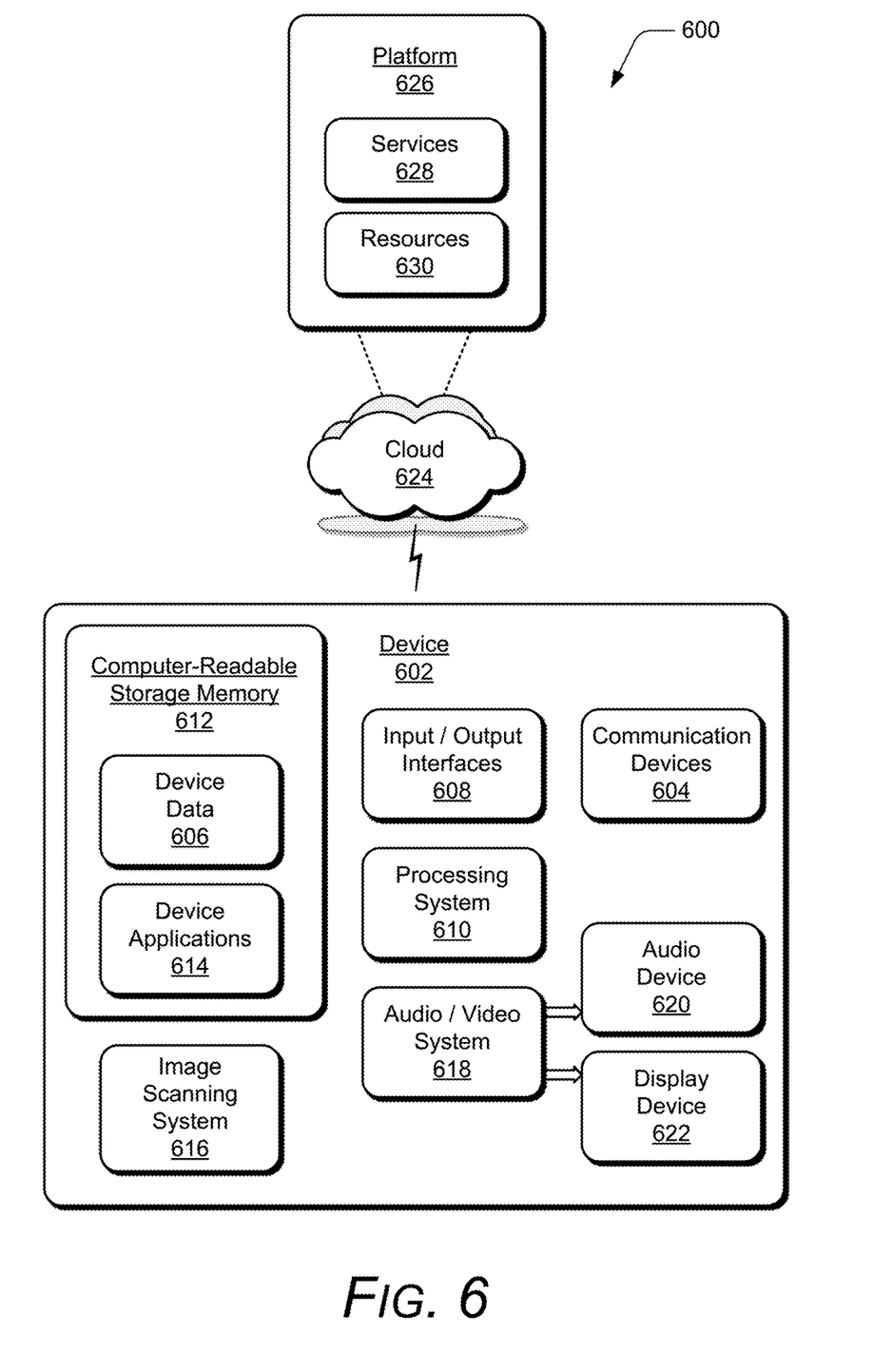
FIG. 6 illustrates an example system with an example device that can implement aspects of opting-in or opting-out of visual tracking.

FIG. 6 illustrates an example system 600 that includes an example device 602, which can implement techniques of opting-in or opting-out of visual tracking. The example device 602 can be implemented as any of the computing devices, mobile devices, server devices, and/or services described with reference to the previous FIGS. 1-5, such as any type of computing device, client device, mobile phone, tablet, communication, entertainment, gaming, media playback, and/or other type of device. For example, the computing device 102, the server computing device 510, and/or various server devices of the cloud-based service system 502 may be implemented as the example device 602.

The example device 602 includes communication devices 604 that enable wired and/or wireless communication of device data 606, such as the digital images and tracking data that is communicated between the devices in a network, as well as computer applications data and content that is transferred from one computing device to another, and/or synched between multiple computing devices. The device data 606 can include any type of audio, video, image, and/or graphic data that is generated by applications executing on the device. The communication devices 604 can also include transceivers for cellular phone communication and/or for network data communication.

The device 602 also includes input/output (I/O) interfaces 608, such as data network interfaces that provide connection and/or communication links between the device, data networks, and other devices. The I/O interfaces can be used to couple the device to any type of components, peripherals, and/or accessory devices, such as a digital camera device and/or computer input device that may be integrated with the example device 602. The I/O interfaces also include data input ports via which any type of data, media content, and/or inputs can be received, such as user inputs to the device, as well as any type of audio, video, and/or image data received from any content and/or data source.

The device 602 includes a processing system 610 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The example device 602 also includes computer-readable storage memory 612, such as data storage devices implemented in hardware that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory 612 can include various implementations of random access memory (RAM), read-only memory (ROM), flash memory, and other types of storage memory in various memory device configurations.

The computer-readable storage memory 612 provides storage of the device data 606 and various device applications 614, such as an operating system that is maintained as a software application with the computer-readable storage memory and executed by the processing system 610. In this example, the device 602 includes an image scanning system 616 that implements the described techniques of opting-in or opting-out of visual tracking, and may be implemented with hardware components and/or in software as one of the device applications 614, such as when the example device 602 is implemented as the computing device 102 or as the server computing device 510 shown in FIGS. 1, 2, and 5. An example of the image scanning system 616 includes the image scanning system 104 that is implemented as a software application and/or as hardware components by the computing device 102, by the server computing device 510, and/or by other various server devices of the cloud-based service system 502, as described with reference to FIGS. 1-5. In implementations, the image scanning system 616 may include independent processing, memory, and logic components as a computing and/or electronic device integrated with the device 602.

The device 602 also includes an audio and/or video system 618 that generates audio data for an audio device 620 and/or generates display data for a display device 622. The audio device and/or the display device include any devices that process, display, and/or otherwise render audio, video, display, and/or image data. In implementations, the audio device and/or the display device are integrated components of the example device 602. Alternatively, the audio device and/or the display device are external, peripheral components to the example device. In embodiments, at least part of the techniques described for opting-in or opting-out of visual tracking may be implemented in a distributed system, such as over a "cloud" 624 in a platform 626. The cloud 624 includes and/or is representative of the platform 626 for services 628 and/or resources 630. For example, the services 628 may include the cloud-based service system 502 described with reference to FIGS. 1-5.

The platform 626 abstracts underlying functionality of hardware, such as server devices (e.g., included in the services 628) and/or software resources (e.g., included as the resources 630), and connects the example device 602 with other devices, servers, etc. The resources 630 may also include applications and/or data that can be utilized while computer processing is executed on servers that are remote from the example device 602. Additionally, the services 628 and/or the resources 630 may facilitate subscriber network services, such as over the Internet, a cellular network, or Wi-Fi network. The platform 626 may also serve to abstract and scale resources to service a demand for the resources 630 that are implemented via the platform, such as in an interconnected device embodiment with functionality distributed throughout the system 600. For example, the functionality may be implemented in part at the example device 602 as well as via the platform 626 that abstracts the functionality of the cloud 624.

Although implementations of opting-in or opting-out of visual tracking have been described in language specific to features and/or methods, the appended claims are not necessarily limited to the specific features or methods described. Rather, the specific features and methods are disclosed as example implementations of opting-in or opting-out of visual tracking, and other equivalent features and methods are intended to be within the scope of the appended claims. Further, various different examples are described and it is to be appreciated that each described example can be implemented independently or in connection with one or more other described examples.

The invention claimed is:

1. In a digital medium environment for detection of opting-in or opting-out of visual tracking for computer vision processing, a method implemented by at least one computing device, the method comprising:
   detecting faces of people in a group who are depicted in a digital image from a scan of the digital image;
   scanning the digital image for wearable visual tracking identifiers worn by the people in the group, the wearable visual tracking identifiers indicating a preference of a person for one of the opting-in or the opting-out of the visual tracking, the scanning for a wearable visual tracking identifier including scanning within a region at a defined distance from the face of the person, the defined distance designating a size of the region based on face dimensions of the face of the person;
   detecting the wearable visual tracking identifier associated with the person based on the scanning of the digital image, the wearable visual tracking identifier detected within the region of the defined distance from the face of the person and distinguishing the preference of the person for the opting-in or the opting-out of the visual tracking from the other people in the group; and
   discontinuing the visual tracking of the person based on the wearable visual tracking identifier associated with the person indicating that the person opts-out of the visual tracking.

2. The method as recited in claim 1, further comprising: scanning the digital image for the face of the person who is depicted in the digital image.

3. The method as recited in claim 1, wherein the wearable visual tracking identifier includes a non-consent symbol that is detectable by an image scanning system, the non-consent symbol designed to indicate the preference for opting-out of the visual tracking for the computer vision processing.

4. The method as recited in claim 1, further comprising: cropping the face of the person out of the digital image based on the wearable visual tracking identifier indicating that the person opts-out of the visual tracking.

5. The method as recited in claim 1, further comprising: continuing the visual tracking of the person based on the wearable visual tracking identifier indicating that the person opts-in to the visual tracking.

6. The method as recited in claim 5, wherein the wearable visual tracking identifier includes a consent symbol that is detectable by an image scanning system, the consent symbol designed to indicate the preference for opting-in to the visual tracking for the computer vision processing.

7. The method as recited in claim 1, further comprising:
determining the region within the defined distance from the face of the person in which to scan the digital image for the wearable visual tracking identifier.

8. The method as recited in claim 1, wherein the digital image is scanned for the wearable visual tracking identifiers within the respective regions adjacent to the faces of each of the people in the group.

9. In a digital medium environment for detection of opting-in or opting-out of visual tracking, a method implemented by at least one computing device, the method comprising:
detecting faces of people in a group who are depicted in a digital image from a scan of the digital image;
scanning the digital image for wearable visual tracking identifiers worn by the people in the group, the wearable visual tracking identifiers indicating a preference of a person for one of the opting-in or the opting-out of the visual tracking;
detecting the visual tracking identifier associated with the person based on the scanning of the digital image, the scanning for a wearable visual tracking identifier including scanning within a region at a defined distance from the face of the person, the defined distance designating a size of the region based on face dimensions of the face of the person;
detecting the wearable visual tracking identifier associated with the person based on the scanning of the digital image, the wearable visual tracking identifier detected within the region of the defined distance from the face of the person and distinguishing the preference of the person for the opting-in or the opting-out of the visual tracking from the other people in the group; and
continuing the visual tracking of the person based on the wearable visual tracking identifier associated with the person indicating that the person opts-in to the visual tracking.

10. The method as recited in claim 9, further comprising:
scanning the digital image for the face of the person who is depicted in the digital image.

11. The method as recited in claim 9, wherein the wearable visual tracking identifier includes a consent symbol that is detectable by an image scanning system, the consent symbol designed to indicate the preference for opting-in to the visual tracking for computer vision processing.

12. The method as recited in claim 11, further comprising:
defaulting to the opting-out of the visual tracking if the consent symbol of the wearable visual tracking identifier is not distinguishable in the digital image so as to indicate that the person opts-in to the visual tracking.

13. The method as recited in claim 9, further comprising:
discontinuing the visual tracking of the person based on the wearable visual tracking identifier indicating that the person opts-out of the visual tracking.

14. The method as recited in claim 13, wherein the wearable visual tracking identifier includes a non-consent symbol that is detectable by an image scanning system, the non-consent symbol designed to indicate the preference for opting-out of the visual tracking for computer vision processing.

15. A computing device implemented to scan digital images for detection of opting-in or opting-out of visual tracking, the computing device comprising:
a memory to maintain the digital images received for scanning;
a processor system configured to execute an image scanning system implemented to perform operations comprising to:
receive a digital image depicting faces of people in a group who are depicted in the digital image;
detect the faces of the people who are depicted in the digital image from a scan of the digital image;
scan the digital image for wearable visual tracking identifiers worn by the people in the group, the wearable visual tracking identifiers indicating a preference of a person for one of the opting-in or the opting-out of the visual tracking, the scan for a wearable visual tracking identifier including to scan within a region at a defined distance from the face of the person, the defined distance designating a size of the region based on face dimensions of the face of the person;
detect the wearable visual tracking identifier associated with the person based on the scan of the digital image, the wearable visual tracking identifier detected within the region of the defined distance from the face of the person and distinguishing the preference of the person for the opting-in or the opting-out of the visual tracking from the other people in the group; and
continue the visual tracking of the person based on the wearable visual tracking identifier associated with the person indicating that the person opts-in to the visual tracking.

16. The computing device as recited in claim 15, wherein the wearable visual tracking identifier includes a non-consent symbol that is detectable by the image scanning system, the non-consent symbol designed to indicate the preference for opting-out of the visual tracking for computer vision processing.

17. The computing device as recited in claim 15, wherein the image scanning system is implemented to crop the face of the person out of the digital image based on the wearable visual tracking identifier indicating that the person opts-out of the visual tracking.

18. The computing device as recited in claim 15, wherein the image scanning system is implemented to discontinue the visual tracking of the person based on the wearable visual tracking identifier indicating that the person opts-out of the visual tracking.

19. The computing device as recited in claim 15, wherein the wearable visual tracking identifier includes a consent symbol that is detectable by the image scanning system, the consent symbol designed to indicate the preference for opting-in to the visual tracking for computer vision processing.

20. The computing device as recited in claim 15, wherein the image scanning system is implemented to scan the digital image for the visual tracking identifiers within the respective regions adjacent to the faces of each of the people in the group.

* * * * *